US009240268B2

(12) United States Patent  
Smoot et al.

(10) Patent No.: US 9,240,268 B2  
(45) Date of Patent: Jan. 19, 2016

(54) MAGNETICALLY MOVABLE OBJECTS OVER A DISPLAY OF AN ELECTRONIC DEVICE

(71) Applicant: Disney Enterprises, Inc., Burbank, CA (US)

(72) Inventors: Lanny Starkes Smoot, Thousand Oaks, CA (US); Jarvis Schultz, Evanston, IL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/586,647

(22) Filed: Dec. 30, 2014

(65) Prior Publication Data

US 2015/0109711 A1    Apr. 23, 2015

Related U.S. Application Data

(63) Continuation of application No. 14/226,682, filed on Mar. 26, 2014, now Pat. No. 8,976,501, which is a continuation of application No. 13/475,818, filed on May 18, 2012, now Pat. No. 8,737,035.

(51) Int. Cl.
| | |
|---|---|
| *H01F 7/06* | (2006.01) |
| *G06F 1/16* | (2006.01) |
| *H01H 47/00* | (2006.01) |
| *A63F 3/00* | (2006.01) |
| *A63H 33/26* | (2006.01) |
| *G06F 3/0488* | (2013.01) |

(Continued)

(52) U.S. Cl.  
CPC ............ *H01F 7/064* (2013.01); *A63F 3/00643* (2013.01); *A63F 3/00694* (2013.01); *A63H 33/26* (2013.01); *G06F 1/1694* (2013.01); *G06F 3/04883* (2013.01); *H01H 47/00* (2013.01); *A63F 7/0088* (2013.01); *A63F 9/34* (2013.01); *A63F 2003/0063* (2013.01); *A63F 2003/00662* (2013.01); *A63F 2009/241* (2013.01); *A63F 2009/345* (2013.01)

(58) Field of Classification Search  
CPC ........... H01F 7/064; G06F 1/694; A63F 9/34; A63F 2009/345; A63F 2009/241; A63F 2003/0063; A63F 3/00694  
USPC ....................................................... 361/144  
See application file for complete search history.

(56) References Cited

U.S. PATENT DOCUMENTS

| | | | | |
|---|---|---|---|---|
| 4,991,836 | A | * | 2/1991 | Joffe ......................... A63F 9/34 273/239 |
| 5,848,788 | A | * | 12/1998 | Hess ................... A63F 3/00643 273/239 |

(Continued)

*Primary Examiner* — Scott Bauer  
(74) *Attorney, Agent, or Firm* — Farjami & Farjami LLP

(57) ABSTRACT

In one implementation, the present disclosure provides a method for imparting motion to a magnetically movable object. The method includes disposing the magnetically movable object over a display of an electronic device. The method further includes imparting motion to the magnetically movable object by adjusting a magnetic field that is produced by a magnetic field source, the magnetic field being applied to the magnetically movable object through the display of the electronic device. The adjusting the magnetic field can be based on a location of the magnetically movable object over the display. Furthermore, the display can be a touch sensitive display and the adjusting the magnetic field can be based on touch input of the touch sensitive display. The imparting motion can include moving the magnetically movable object around the display.

20 Claims, 6 Drawing Sheets

(51) Int. Cl.
 *A63F 9/34* (2006.01)
 *A63F 7/00* (2006.01)
 *A63F 9/24* (2006.01)

(56) References Cited

U.S. PATENT DOCUMENTS

| | | | | |
|---|---|---|---|---|
| 5,853,327 | A * | 12/1998 | Gilboa | A63F 3/00643 273/237 |
| 6,761,634 | B1 * | 7/2004 | Peterson | A63F 3/00643 273/236 |
| 7,843,471 | B2 * | 11/2010 | Doan | A63F 1/04 345/418 |
| 2010/0201069 | A1 * | 8/2010 | Lam | A63F 3/00643 273/237 |
| 2011/0272884 | A1 * | 11/2011 | Kraegeloh | A63F 3/00 273/237 |
| 2012/0019480 | A1 * | 1/2012 | Cannon | A63F 13/02 345/174 |
| 2014/0194029 | A1 * | 7/2014 | Pardi | A63H 33/26 446/71 |

* cited by examiner

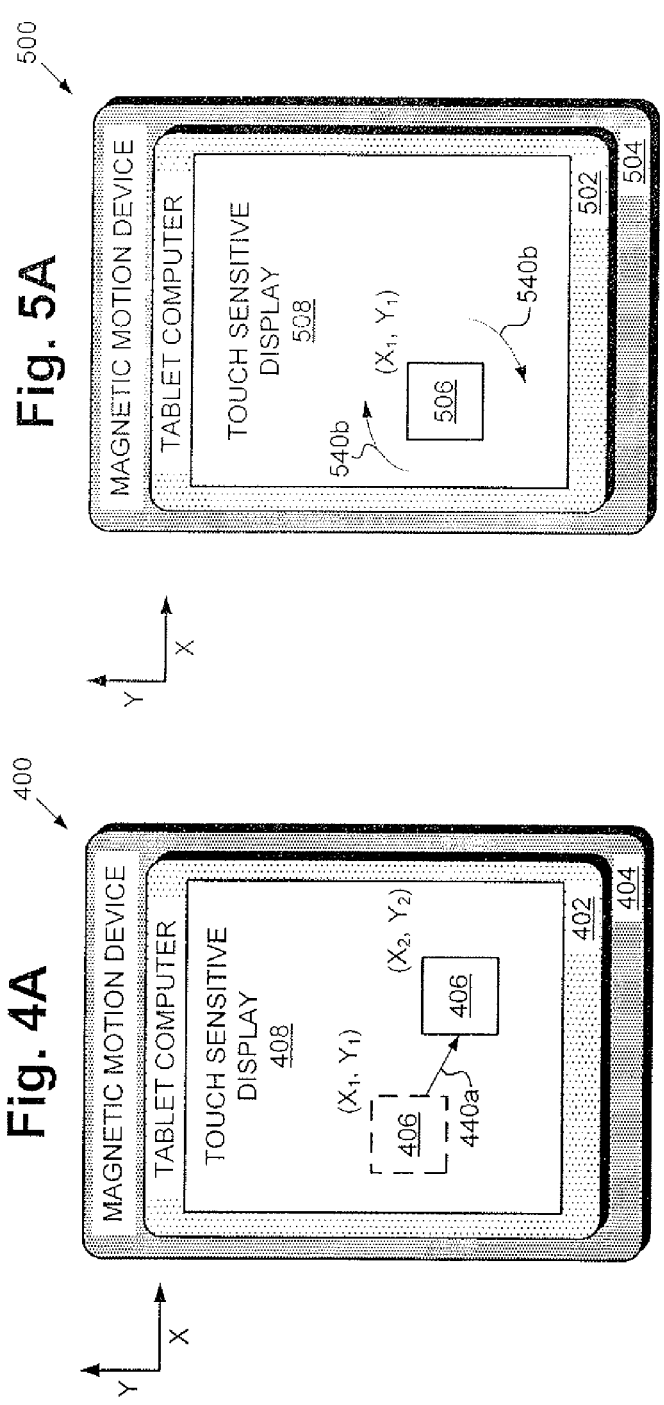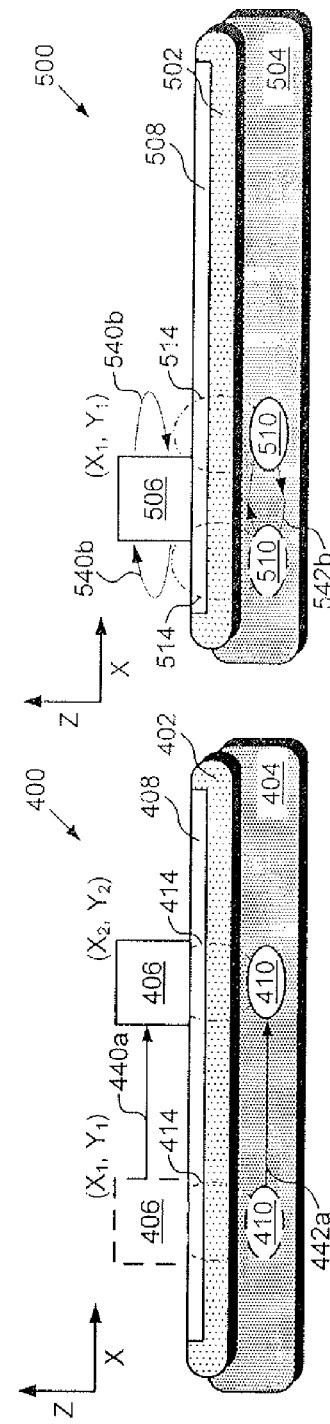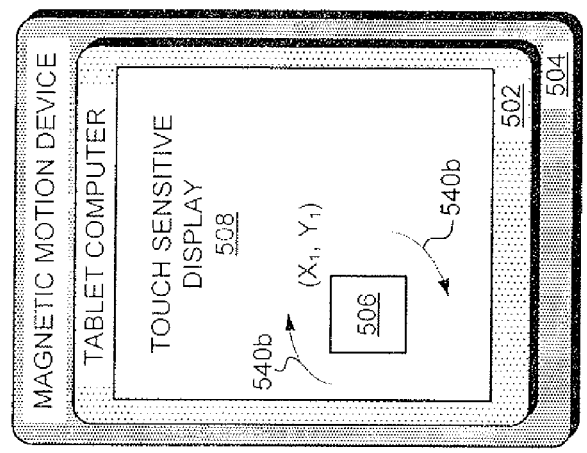

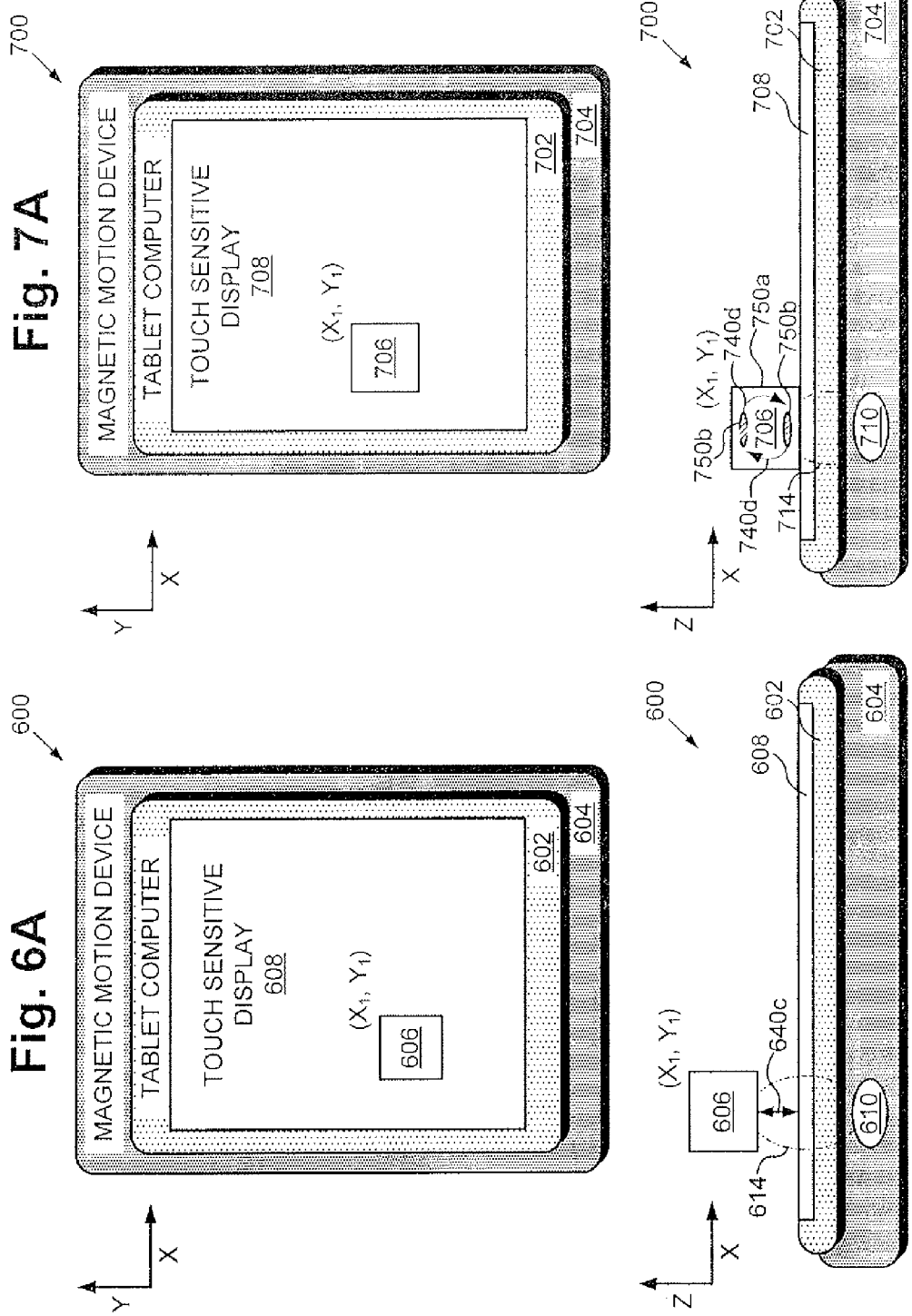

MAGNETICALLY MOVABLE OBJECTS OVER A DISPLAY OF AN ELECTRONIC DEVICE

This application is a Continuation of U.S. application Ser. No. 14/226,682, filed Mar. 26, 2014, which is a Continuation of U.S. application Ser. No. 13/475,818, filed May 18, 2012, which are hereby incorporated by reference in their entirety.

BACKGROUND

Touch sensitive devices, such as touch screen devices, are becoming increasingly prevalent in the marketplace. These touch sensitive devices offer a touch sensitive surface that can detect the presence and position of touch input opening up the possibility of new ways to interact with electronic devices. As one example, the popularity of recent touch screen devices, such as iPad from APPLE®, means that touch screen devices can be found among many family households. At the same time, physical toys remain a staple of kids, with collectible figures serving as a bedrock for imaginative toy play in the form of interaction between the figures as well as the larger environment. In this context, it would be desirable to provide new technologies, which can enhance the interactive experience between touch screen devices and objects, such as toys.

SUMMARY

The present disclosure is directed to magnetically movable objects over a display of an electronic device, substantially as shown in and/or described in connection with at least one of the figures, as set forth more completely in the claims.

BRIEF DESCRIPTION OF THE DRAWINGS

FIG. 4A presents a top view of a magnetic motion system, according to one implementation of the present disclosure;

FIG. 4B presents a cross-sectional side view of a magnetic motion system, according to one implementation of the present disclosure;

FIG. 5A presents a top view of a magnetic motion system, according to one implementation of the present disclosure;

FIG. 5B presents a cross-sectional side view of a magnetic motion system, according to one implementation of the present disclosure;

FIG. 6A presents a top view of a magnetic motion system, according to one implementation of the present disclosure;

FIG. 6B presents a cross-sectional side view of a magnetic motion system, according to one implementation of the present disclosure;

FIG. 7A presents a top view of a magnetic motion system, according to one implementation of the present disclosure; and FIG. 7B presents a cross-sectional side view of a magnetic motion system, according to one implementation of the present disclosure.

DETAILED DESCRIPTION

Figure 1A:
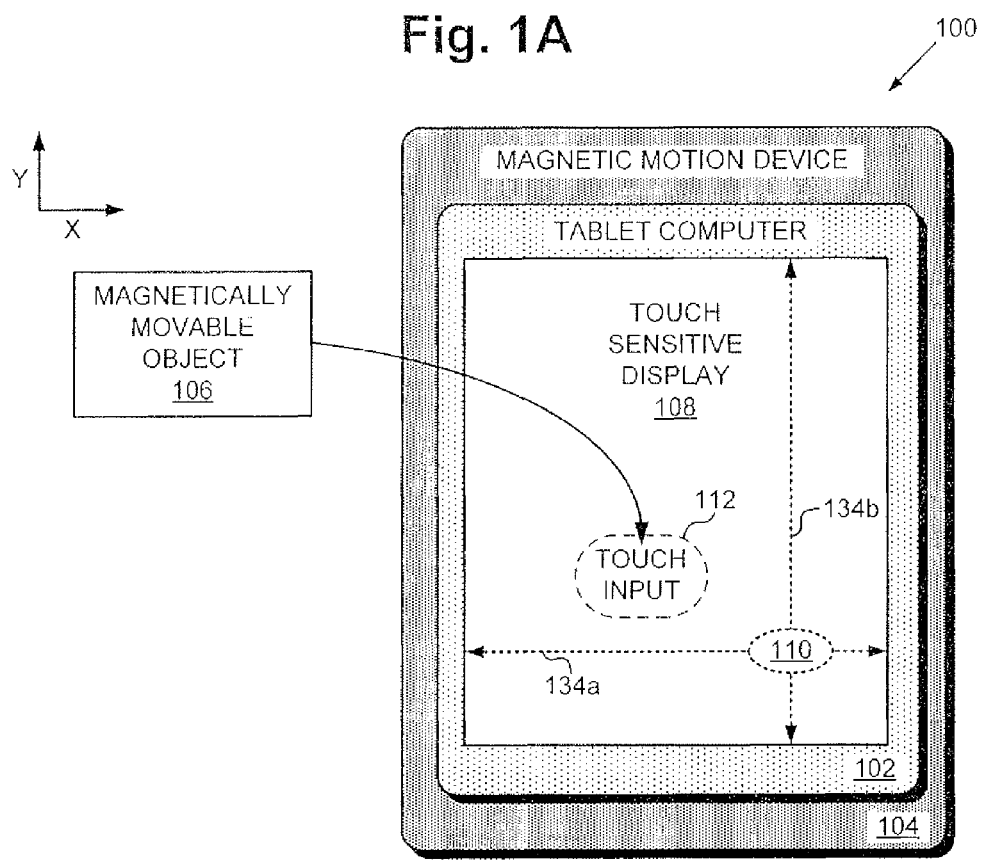
FIG. 1A presents a top view of a magnetic motion system, according to one implementation of the present disclosure.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1B:
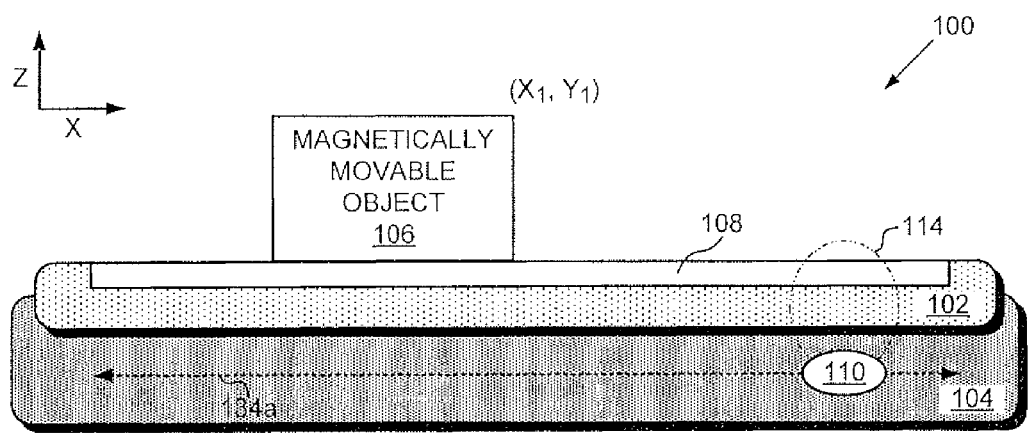
FIG. 1B presents a cross-sectional side view of a magnetic motion system, according to one implementation of the present disclosure.

FIG. 1A presents a top view of magnetic motion system 100 (also referred to as "system 100") and FIG. 1B presents a cross-sectional side view of magnetic motion system 100, according to one implementation of the present disclosure. System 100 includes electronic device 102, magnetic motion device 104, and magnetically movable object 106.

As shown in FIGS. 1A and 1B, electronic device 102 includes display 108. In the present implementation, electronic device 102 is a touch screen device, and more particularly a tablet computer, such as an iPad from APPLE®. However, in various implementations, electronic device 102 can be any electronic device capable of utilizing display 108. For example, electronic device 102 need not be a touch screen device and display 108 need not be a touch sensitive display of the touch screen device. Examples of electronic device 102 include a tablet computer, a smart phone, such as an iPhone from APPLE®, a television or monitor, such as a projection (e.g. front or rear projection), liquid crystal display (LCD), plasma, or organic light-emitting diode (OLED) television or monitor, a portable gaming system, a digital calculator, a camera, and may other types of electronic devices.

Display 108 of electronic device 102 is generally any type of display area such that electronic device 102 controls what is presented on the display area. The display area can be of a fixed geometry and can be planar or curved, as examples. While display 108 can include active displays such as a touch screen, LCD, plasma, and OLED displays, display 108 can also include more exotic displays, for example, passive displays, such as a surface that is modified by a marking tool, where electronic device 102 controls the marking tool. One example is a whiteboard where electronic device 102 controls a whiteboard pen of display 108 to write on the whiteboard (i.e. controls what is presented on display 108). Another example is where display 108 is a floor having an image projected thereon by electronic device 102.

In the present implementation, display 108 is a touch sensitive display of electronic device 102. In some implementations, magnetically movable object 106 can be placed over display 108 to provide touch input 112 to display 108. FIG. 1B shows magnetically movable object 106 placed over display 108 at location $(X_1, Y_1)$, where display 108 is situated between magnetically movable object 106 and magnetic field source 110. To detect touch input 112, display 108 can utilize, for example, any combination of resistive, capacitive, surface acoustic wave, infrared, optical imaging, dispersive signal, and acoustic pulse based sensing.

Thus, in some implementations, magnetically movable object 106 can provide touch input 112 to display 108. In some implementations, magnetically movable object 106 must be of sufficient weight to provide touch input 112 to display 108. In some implementations, magnetically movable object 106 must be of sufficient size to provide touch input 112 to display 108. Furthermore, in some implementations, magnetically movable object 106 must be capable of electrically disturbing display 108 to provide touch input 112 to display 108. One example is where display 108 utilizes capacitive sensing of touch input 112, which can be generated by providing a path to ground. A human finger touching magnetically movable object 106 may provide the path to ground, for example. Furthermore, the path to ground can be conductively routed through magnetically movable object 106 to one or more touch points that provide touch input 112 to display 108. Examples of this approach include where magnetically movable object 106 is a stylus, or a peripheral device or game piece as described in commonly owned U.S. Patent Application Publication No. 2012/0007808 titled "Interactive Game Pieces using Touch Screen Devices for Toy Play," which is hereby incorporated by reference in its entirety.

Additionally, in various implementations, touch input 112 is electrically generated by magnetically movable object 106. For example, magnetically movable object 106 can electrically generate a simulated ground path that provides touch input 112 to display 108. As a specific example, it has been found that a high electrostatic alternating current, provided by magnetically movable object 106, can generate the simulated ground path. Magnetically movable object 106 can generate the high electrostatic alternating current, for example, using a high voltage generator (e.g. 100 volts or greater) that has very low current. This approach can be employed at least in implementations where display 108 utilizes capacitive sensing, such as in the iPad, iPhone, and iPod from APPLE®.

Figure 1C:
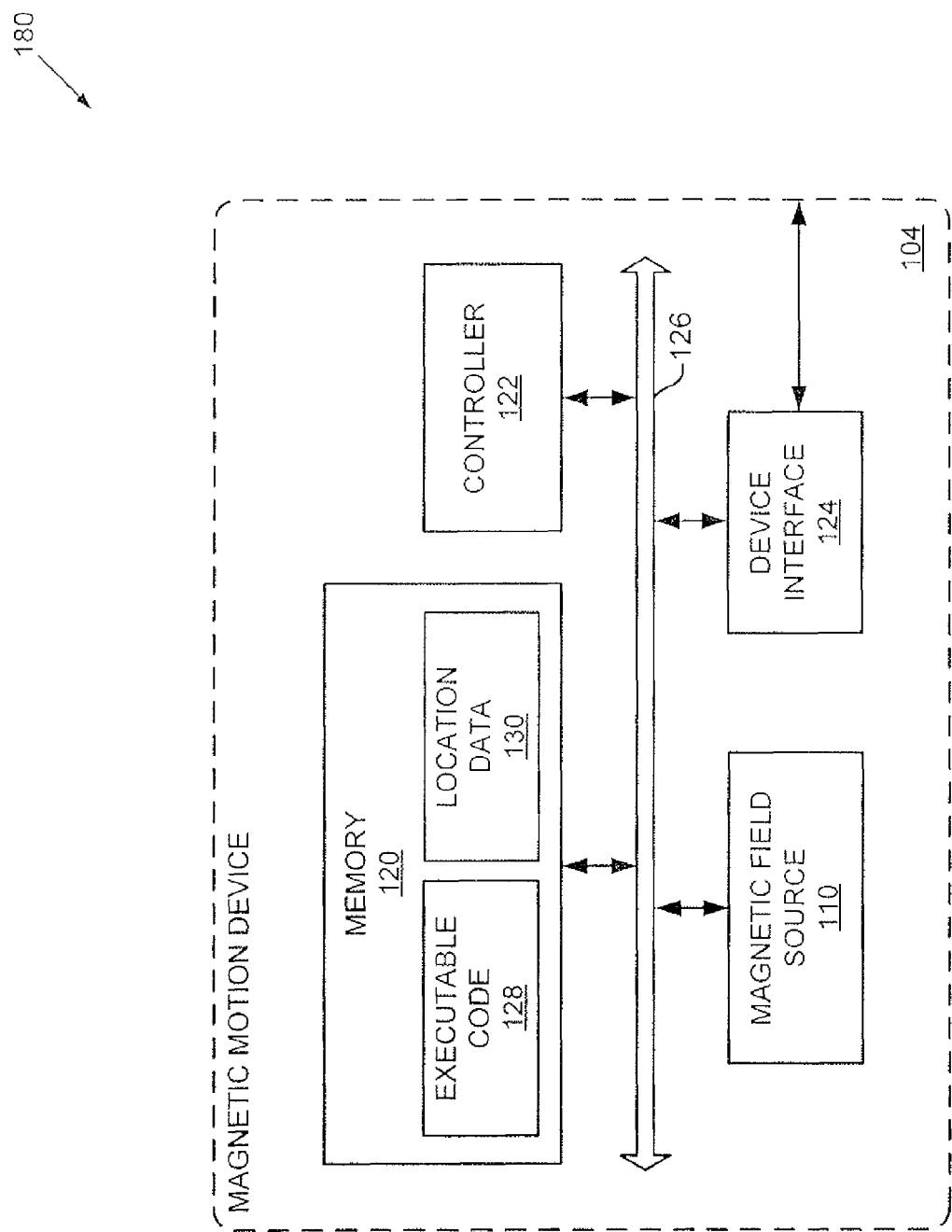
FIG. 1C presents an exemplary diagram of a magnetic motion device, according to one implementation of the present disclosure.

FIG. 1C presents diagram 180 of magnetic motion device 104. Diagram 180 shows magnetic motion device 104 including magnetic field source 110, memory 120, controller 122, and device interface 124.

In the present implementation, magnetic field source 110, memory 120, controller 122, and device interface 124 can communicate with each other over bus 126. Magnetic field source 110, memory 120, controller 122, and device interface 124 can communicate with each other over bus 126 to impart motion to magnetically movable object 106 by adjusting magnetic field 114 that is produced by magnetic field source 110, where magnetic field 114 is being applied to magnetically movable object 106 through display 108 of electronic device 102. It will be appreciated that magnetic field source 110, memory 120, controller 122, and device interface 124 can communicate with each other over other means, for example, a plurality of dedicated lines, or a combination of buses and dedicated lines.

Magnetic motion device 104 includes magnetic field source 110 to produce magnetic field 114, shown in FIG. 1B, where magnetic field 114 can be applied to magnetically movable object 106 through display 108 of electronic device 102 (not shown in FIGS. 1A, 1B, & 1C). Thus, in various implementations, such as the one shown, display 108 is magnetically permeable. In some implementations, magnetic field 114 is an electromagnetic field produced by magnetic field source 110. In some implementations, the electromagnetic field is used to provide power to magnetically movable object 106, which can be stored in magnetically movable object 106. Also, in some implementations, magnetic field source 110 includes at least one magnet. Furthermore, in some implementations, magnetic field source 110 includes at least one electromagnet. In one implementation, magnetic field source 110 includes at least one magnetic coil.

Magnetic field 114 can magnetically connect magnetic field source 110 and magnetically movable object 106. Thus, magnetically movable object 106 can include, for example, ferromagnetic and/or ferromagnetic materials. In some implementations, magnetically movable object 106 includes at least one magnet. For example, magnetically movable object 106 can have magnetic wheels that are placed on display 108. Also, in some implementations, magnetically movable object 106 includes at least one electromagnet.

In some implementations, magnetic field 114 is sufficiently strong so that magnetically movable object 106 does not fall away from display 108, even where display 108 is in a vertical position (in the XZ plane), as opposed to a horizontal position (in the XY plane shown in FIG. 1A). In other words, where display 108 is rotated 90 degrees from what is shown in FIGS. 1A and 1B.

Magnetic motion device 104 also includes controller 122 to impart motion to magnetically movable object 106 by using magnetic field source 110 to adjust magnetic field 114. Controller 122, which can include, for example, a central processing unit (CPU), an embedded processor, a microcontroller, and/or other logical units, is configured to operate in accordance with executable code 128 stored in memory 120. In one specific implementation, controller 122 includes a peripheral interface controller (PIC). Memory 120 can include, as examples, random access memory (RAM) and/or read only memory (ROM). In some implementations, for example, memory 120 includes registers of controller 122. Memory 120 can include one or more banks of memory and one or more types of memory, which can be located remotely from one another. Executable code 128 includes, for example, instructions for controller 122 to execute in order to impart motion to magnetically movable object 106 by using magnetic field source 110 to adjust magnetic field 114.

In some implementations, controller 122 receives location $(X_1, Y_1)$ of magnetically movable object 106 (shown in FIG. 1B) and imparts motion to magnetically movable object 106 by using magnetic field source 110 to adjust magnetic field 114 based on location $(X_1, Y_1)$ of magnetically movable object 106 over display 108. As shown in FIG. 1C, memory 120 has location data 130, which corresponds to location $(X_1, Y_1)$ in FIG. 1B. Thus, controller 122 can receive location $(X_1, Y_1)$ of magnetically movable object 106 by accessing memory 120.

In some implementations, display 108 is a touch sensitive display and location $(X_1, Y_1)$ is from touch input 112 of display 108. Thus, in some implementations, controller 122 imparts motion to magnetically movable object 106 by using magnetic field source 110 to adjust magnetic field 114 based on touch input 112. However, in various implementations, location $(X_1, Y_1)$ is not necessarily from touch input 112 of display 108. For example, in some implementations, system 100 does not include a touch sensitive component and so touch input 112 is not available. As one example, location $(X_1, Y_1)$ can be from a global positioning system (GPS) within, for example, magnetically movable object 106. As another example, magnetically movable object 106 can be magnetically sensed (e.g. by sensing a magnetic field), for example, by magnetic motion device 104 or another device, to determine location $(X_1, Y_1)$ of magnetically movable object 106. In yet another implementation, a photographic image of display 108 is analyzed using a processor (e.g. controller 122) to determine location $(X_1, Y_1)$ of magnetically movable object 106. In some implementations, magnetically movable object 106 includes an optical emitter (e.g. an LED), which is configured to provide location $(X_1, Y_1)$ to electronic device 102. Location $(X_1, Y_1)$ can be optically determined by controller 122 based on output from the optical emitter, which may have an output directed toward display 108. As an example, electronic device 102 can be photosensitive, which may be accomplished utilizing a photosensitive surface, such as a photosensitive display 108 (e.g., a photosensitive touch screen). Also, in some implementations, magnetically movable object 106 includes an optical sensor. The optical sensor can sense a state of display 108, which can be used to determine location $(X_1, Y_1)$ of magnetically movable object 106 and/or for other purposes.

In various implementations, magnetic motion device 104 determines location $(X_1, Y_1)$ of magnetically movable object 106. Also, in some implementations, location $(X_1, Y_1)$ of magnetically movable object 106 is determined externally to magnetic motion device 104, for example by electronic device 102, magnetically movable object 106, and/or another device. Thus, in some implementations, magnetic motion device 104 includes device interface 124 to communicate with other devices, such as electronic device 102. For example, in the present implementation, magnetic motion device 104 receives location $(X_1, Y_1)$ from touch input 112 of display 108 over device interface 124.

In some implementations, controller 122 receives commands from electronic device 102 and/or another device over device interface 124 so as to impart motion to magnetically movable object 106 by using magnetic field source 110 to adjust magnetic field 114. For example, electronic device 102 can determine how to adjust magnetic field 114 and controller 122 can be used to carry out the determined adjustment of magnetic field 114. In one implementation, the commands received over device interface 124 are from a remote control that is coupled to magnetic motion device 104 over a wired or wireless connection. However, it is noted that in some implementations, magnetic motion device 104 does not include device interface 124.

Examples of device interface 124 include FireWire, Universal Serial Bus (USB), Serial Port, Local Area Network (LAN), Portable Digital Media Interface (PDMI), Wireless Fidelity (Wi-Fi), Worldwide Interoperability for Microwave Access (WiMax), ZigBee, Bluetooth, Code Division Multiple Access (CDMA), Evolution-Data Optimized (EV-DO), Global System for Mobile Communications (GSM), Long Term Evolution (LTE), and other types of device interfaces. Thus, device interface 124 can include wired and/or wireless device interfaces. In one implementation, device interface 124 includes a 30-pin dock connector for iPad, iPhone, and iPod from APPLE®.

In FIGS. 1A and 1B, electronic device 102 is shown as being situated on magnetic motion device 104. In the implementation shown, magnetic motion device 104 is separate from electronic device 102. In other words, electronic device 102 and magnetic motion device 104 are in separate enclosures and are discrete devices. In particular, display 108 is part of electronic device 102 and magnetic field source 110 and controller 122 are part of magnetic motion device 104 that is separate from electronic device 102.

However, in various implementations, magnetic motion device 104 can be partially or completely integrated into electronic device 102. Thus, in some implementations, elements described herein with respect to magnetic motion device 104 can be shared by magnetic motion device 104 and electronic device 102, including magnetic field source 110, memory 120, controller 122, and device interface 124. For example, controller 122 can be an A5 or A4 processor of an iPad from Apple®. Similarly, memory 120, controller 122, and device interface 124 can already be parts of the iPad. Furthermore, functionality of magnetic field source 110, memory 120, controller 122, and device interface 124 can be distributed amongst multiple components and the multiple components can be in any combination of magnetic motion device 104, electronic device 102, and/or other devices. Thus, implementations of the present disclosure can be carried out using a variety of device configurations, including those not specifically described herein.

It is further noted that in some implementations, magnetic motion device 104 does not require at least some of memory 120, controller 122, and device interface 124. For example, magnetic motion device 104 can be completely mechanical. Also, magnetic motion device 104 can be mechanically controlled by a user to impart motion to magnetically movable object 106 by adjusting magnetic field 114 that is produced by magnetic field source 110, where magnetic field 114 is being applied to magnetically movable object 106 through display 108 of electronic device 102.

Motion can be imparted to magnetically movable object 106 by using magnetic field source 110 to adjust magnetic field 114 in various manners, some of which will be described in more detail below. The various manners of imparting motion to magnetically movable object 106 can be combined to provide unique interactive experiences. As one example, controller 122 or a user can move magnetic field source 110 around display 108 to adjust magnetic field 114 and to thereby move magnetically movable object 106. As indicated in FIGS. 1A and 1B, in the present implementation, controller 122 can move magnetic field source 110 along X-axis 134a and along Y-axis 134b. By combining motion along X-axis 134a and Y-axis 134b, controller 122 or a user can move magnetic field source 110, and thus magnetic field 114, in any direction around display 108.

Moving magnetic field source 110 can be accomplished in various manners, including mechanically and/or electrically. As one example, magnetic motion device 104 can have a pulley system, with one knob to mechanically move magnetic field source 110 along X-axis 134a and another knob to mechanically move magnetic field source 110 along Y-axis 134b. In some implementations, a user rotates the knobs to move magnetic field source 110 around display 108. Also, in some implementations, controller 122 electrically rotates the knobs, for example, using a motor, to move magnetic field source 110 around display 108. In one implementation, a steering wheel has an axel that is attached to the pulley system and can be rotated by a user to steer magnetic field source 110 along X-axis 134a and Y-axis 134b.

As another example, controller 122 or a user can alter the intensity of magnetic field 114 to adjust magnetic field 114 and to thereby move magnetically movable object 106. Altering the intensity of magnetic field 114 can include pulsing magnetic field 114 in intensity and/or reversing polarity of magnetic field 114.

In one implementation, magnetic field source 110 comprises an array of electromagnets. The array of electromagnets can be activated (e.g. by controller 122) singly, or in groups of one or more to alter magnetic field 114 so as to impart motion to magnetically movable object 106. In this way, magnetic field source 110 does not necessarily have to mechanically move in order to move magnetically movable object 106.

Figure 2:
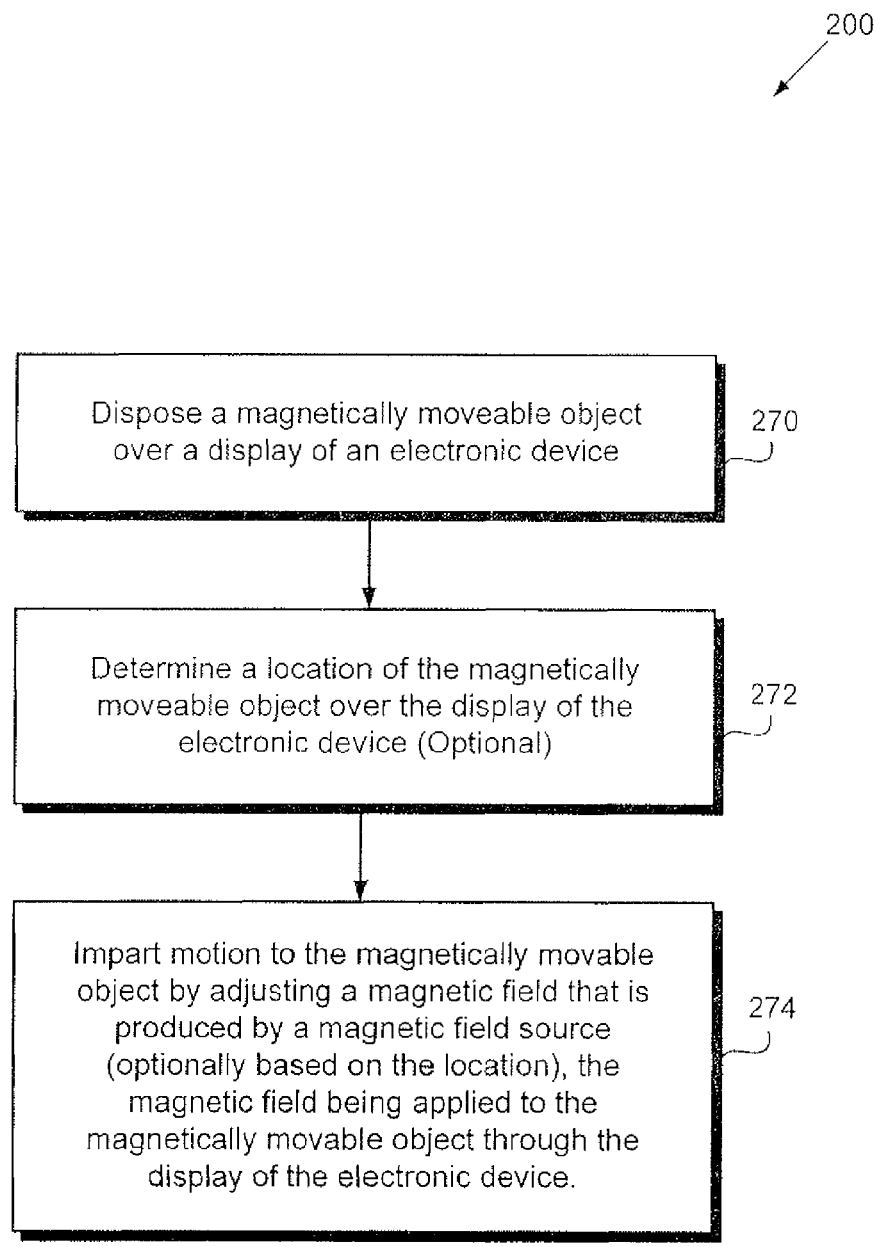
FIG. 2 shows a flowchart describing a method for imparting motion to a magnetically movable object, according to one implementation of the present disclosure.

Referring now to FIG. 2, FIG. 2 presents exemplary flowchart 200 illustrating a method for imparting motion to a magnetically movable object. The approach and technique indicated by flowchart 200 are sufficient to describe at least one implementation of the present disclosure, however, other implementations of the disclosure may utilize approaches and techniques different from those shown in flowchart 200. Furthermore, while flowchart 200 is described with respect to FIGS. 3A, 3B, 4A, 4B, 5A, 5B, 6A, 6B, 7A, and 7B, the disclosed inventive concepts are not intended to be limited by specific features shown in FIGS. 3A, 3B, 4A, 4B, 5A, 5B, 6A, 6B, 7A, and 7B.

Figure 3A:
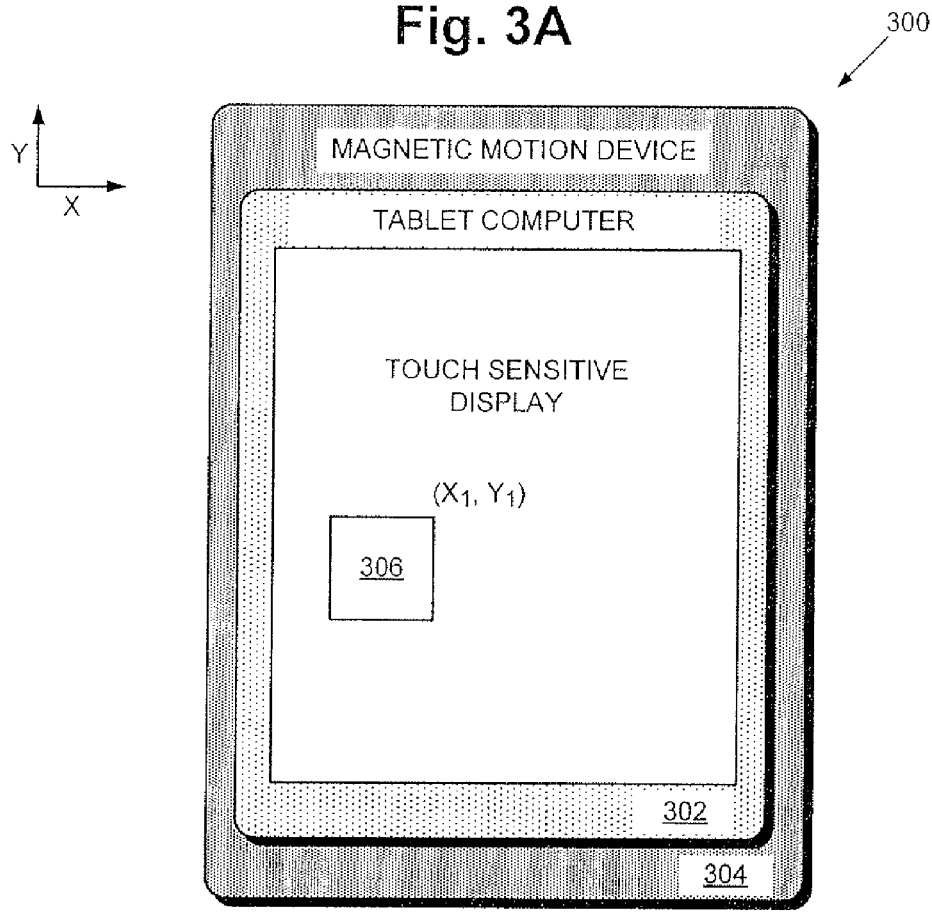
FIG. 3A presents a top view of a magnetic motion system, according to one implementation of the present disclosure.
Figure 3B:
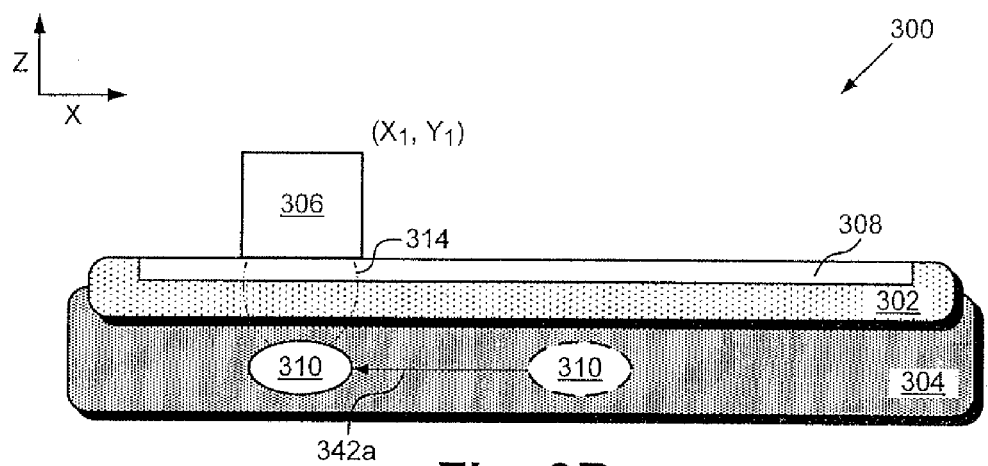
FIG. 3B presents a cross-sectional side view or a magnetic motion system, according to one implementation of the present disclosure.

Referring to flowchart 200 of FIG. 2 and FIGS. 3A and 3B, flowchart 200 includes disposing a magnetically movable object over a display of an electronic device (action 270 in flowchart 200). FIG. 3A presents a top view of magnetic motion system 300 (also referred to as "system 300") and FIG. 3B presents a cross-sectional side view of magnetic motion system 300, according to one implementation of the present disclosure. System 300 corresponds to system 100 in FIGS. 1A and 1B. Thus, for example, electronic device 302, magnetic motion device 304, magnetically movable object 306, display 308, magnetic field source 310, and magnetic field 314 in system 300 correspond respectively to electronic device 102, magnetic motion device 104, magnetically movable object 106, display 108, magnetic field source 110, and magnetic field 114 in system 100.

FIGS. 3A and 3B show system 300 after disposing magnetically movable object 306 over display 308 of electronic device 302. For example, a user can place magnetically movable object 306 over display 308. In some implementations, magnetically movable object 306 is placed on display 308. Also, in some implementations, disposing magnetically movable object 306 over display 308 of electronic device 302 provides touch input 112, shown in FIG. 1A, to display 308. Magnetically movable object 306 can provide touch input 112 to display 308 in any suitable manner, such as those described above.

Referring now to flowchart 200 of FIG. 2 and FIGS. 3A and 3B, flowchart 200 includes optionally determining a location of the magnetically movable object over the display of the electronic device (action 272 in flowchart 200). For example, location $(X_1, Y_1)$ of magnetically movable object 306 over display 308 of electronic device 302 can be determined by magnetic motion device 304, electronic device 302, and/or another device, in any suitable manner, including those described above with respect to system 100.

Also, in some implementations, controller 122 adjusts magnetic field 314 using magnetic field source 310, by, for example, initiating magnetic contact between moving magnetic field source 310 and magnetically movable object 306. This may include activating magnetic field source 310 where magnetic field source 310 include an electromagnet and/or moving magnetic field source 310 into magnetic contact with magnetically movable object 306 based on location $(X_1, Y_1)$. The foregoing is indicated by motion 342a in FIG. 3B, where magnetic field source 310 is initially not in magnetic contact with magnetically movable object 306 and is thereafter moved under and in magnetic contact with magnetically movable object 306. Dashed lines indicate prior positioning of magnetic field source 310.

In some implementations, a user can place magnetically movable object 306 over magnetic field source 310 or can move magnetic field source 310 under magnetically movable object 306 by visually inspecting system 300 and/or by utilizing other indicia to magnetically connect magnetically movable object 306 and magnetic field source 310 via magnetic field 314. Examples include alignment markings on display 308 and an audible alignment indicator from a speaker of electronic device 302. Thus, it will be appreciated that controller 122 does not require location $(X_1, Y_1)$ in some implementations of the present disclosure.

Referring to flowchart 200 of FIG. 2 and FIGS. 4A, 4B, 5A, 5B, 6A, 6B, 7A, and 7B, flowchart 200 includes imparting motion to the magnetically movable object by adjusting a magnetic field that is produced by a magnetic field source, optionally based on the location, the magnetic field being applied to the magnetically movable object through the display of the electronic device (action 274 in flowchart 200).

FIGS. 4A, 4B, 5A, 5B, 6A, 6B, 7A, and 7B show examples of system 300 in FIGS. 3A and 3B after imparting motion to magnetically movable object 306 by adjusting magnetic field 314 that is produced by magnetic field source 310, optionally based on location $(X_1, Y_1)$, where magnetic field 314 is applied to magnetically movable object 306 through display 308 of electronic device 302.

Referring to FIGS. 4A and 4B, FIG. 4A presents a top view of magnetic motion system 400 (also referred to as "system 400") and FIG. 4B presents a cross-sectional side view of magnetic motion system 400, according to one implementation of the present disclosure. System 400 corresponds to system 100 in FIGS. 1A and 1B. Thus, for example, electronic device 402, magnetic motion device 404, magnetically movable object 406, display 408, magnetic field source 410, and magnetic field 414 in system 400 correspond respectively to electronic device 102, magnetic motion device 104, magnetically movable object 106, display 108, magnetic field source 110, and magnetic field 114 in system 100.

In some implementations, imparting motion includes moving magnetically movable object 406 around display 408. For example, as shown in FIG. 4B, magnetically movable object 406 is moved around display 408 from location $(X_1, Y_1)$ to location $(X_2, Y_2)$ as indicated by motion 440a. Controller 122 adjusts magnetic field 414 to move magnetically movable object 406 around display 408 by, for example, moving magnetic field source 410 around display 408, as indicated by motion 442a. As magnetic field 414 magnetically connects magnetically movable object 406 and magnetic field source 410, magnetic field 414 can move magnetically movable object 406 to follow magnetic field source 410 around display 408. In some implementations, magnetic field 414 repels magnetically movable object 406 away from magnetic field source 410 to move magnetically movable object 406 around display 408.

Thus, for example, magnetically movable object 406 can be a toy car, such as Lightning McQueen from Disney's Cars and can be moved around display 408 to simulate driving. Furthermore, because magnetic field 414 is being applied to magnetically movable object 406 through display 408 of electronic device 402, display 408 can be utilized to further enhance interactive experiences. For example, display 408 can be used to present a video game that can be executed by a processor in electronic device 402. While magnetically movable object 406 moves around display 408, what is presented on display 408 can be altered responsive to motion 440a of magnetically movable object 406. For example, in some implementations, what is presented on display 408 is altered responsive to location $(X_1, Y_1)$ and/or location $(X_2, Y_2)$ magnetically movable object 406, which are stored as location data 130.

Location data 130 can be updated regularly throughout methods of the present disclosure. Location $(X_1, Y_1)$ and location $(X_2, Y_2)$ can be from touch input 112 of display 408. Location $(X_1, Y_1)$ and location $(X_2, Y_2)$ can also be determined based on a location of magnetic field source 410. For instance, location $(X_1, Y_1)$ of magnetically movable object 406 can correspond to the location of magnetic field source 410 due to magnetic contact between magnetically movable object 406 and magnetic field source 410. As one example, the location of magnetic field source 410 can be at or near location ($X_1$, $Y_1$) concurrently with magnetically movable object 406.

Referring to FIGS. 5A and 5B, FIG. 5A presents a top view of magnetic motion system 500 (also referred to as "system 500") and FIG. 5B presents a cross-sectional side view of magnetic motion system 500, according to one implementation of the present disclosure. System 500 corresponds to system 100 in FIGS. 1A and 1B. Thus, for example, electronic device 502, magnetic motion device 504, magnetically movable object 506, display 508, magnetic field source 510, and magnetic field 514 in system 500 correspond respectively to electronic device 102, magnetic motion device 104, magnetically movable object 106, display 108, magnetic field source 110, and magnetic field 114 in system 100.

In some implementations, imparting motion includes rotating magnetically movable object 506 laterally over display 508. For example, as shown in FIGS. 5A and 5B, magnetically movable object 506 is rotated laterally over display 508 at location ($X_1$, $Y_1$) as indicated by motion 540b. Controller 122 adjusts magnetic field 514 to rotate magnetically movable object 506 laterally over display 508 by, for example, moving magnetic field source 510 around a periphery of magnetically movable object 506, as indicated by motion 542b. When magnetic field 514 magnetically connects magnetically movable object 506 and magnetic field source 510, magnetically movable object 506 can rotate to follow magnetic field source 510 over display 508.

By rotating magnetically movable object 506 over display 508, system 500 can achieve more complex motion for magnetically movable object 506. As one example, Magnetically movable object 506 can be a toy top. A user can spin the toy top on display 508 and controller 122 can use magnetic field source 510 to perpetuate the spin by moving magnetic field source 510 around a periphery of the toy top. Controller 122 can also use magnetic field source 510 to initiate the spin of the toy top. Furthermore, using location ($X_1$, $Y_1$), for example, controller 122 can controllably move the spinning toy top across display 508, for example to location ($X_2$, $Y_2$), shown in FIGS. 4A and 4B.

Referring to FIGS. 6A and 6B, FIG. 6A presents a top view of magnetic motion system 600 (also referred to as "system 600") and FIG. 6B presents a cross-sectional side view of magnetic motion system 600, according to one implementation of the present disclosure. System 600 corresponds to system 100 in FIGS. 1A and 1B. Thus, for example, electronic device 602, magnetic motion device 604, magnetically movable object 606, display 608, magnetic field source 610, and magnetic field 614 in system 600 correspond respectively to electronic device 102, magnetic motion device 104, magnetically movable object 106, display 108, magnetic field source 110, and magnetic field 114 in system 100.

In some implementations, imparting motion includes repelling magnetically movable object 606 away from display 608. For example, as shown in FIGS. 6A and 6B, magnetically movable object 606 is repelled away from display 608 at location ($X_1$, $Y_1$) as indicated by motion 640c. Controller 122 adjusts magnetic field 614 to repel magnetically movable object 606 away from display 608 by, for example, altering an intensity of magnetic field 614. For example, in one implementation, controller 122 adjusts magnetic field 614 by reversing the polarity of magnetic field 614. Thus, magnetic field 614 can be a repulsive force to, for example, repel magnetically movable object 606, or parts of magnetically movable object 606, away from display 608.

By, repelling magnetically movable object 606 away from display 608, system 600 can achieve more complex motion for magnetically movable object 606. For example, where magnetically movable object 606 is Lightning McQueen from Disney's Cars, when Lightning McQueen drives over an image of gravel presented on display 608, magnetically movable object 606 can be made to vibrate by being repelled from display 608 to simulate a gravel surface. Lightning McQueen can also be made to physically jump, for example, responsive to user input.

As another example, magnetically movable object 606 can be a stylus or other object that is in physical contact with a user. By repelling magnetically movable object 606 away from display 608, controller 122 can adjust magnetic field source 610 to provide haptic feedback to the user. To illustrate the forgoing, display 608 can be presenting a drawing program that is executed by electronic device 602. The drawing program can have different types of drawing tools that each provide different haptic feedback to a user. Thus, drawing with a drawing tool that is a marker could feel different to the user as compared to drawing with a drawing tool that is a paint brush.

Referring to FIGS. 7A and 7B, FIG. 7A presents a top view of magnetic motion system 700 (also referred to as "system 700") and FIG. 7B presents a cross-sectional side view of magnetic motion system 700, according to one implementation of the present disclosure. System 700 corresponds to system 100 in FIGS. 1A and 1B. Thus, for example, electronic device 702, magnetic motion device 704, magnetically movable Object 706, display 708, magnetic field source 710, and magnetic field 714 in system 700 correspond respectively to electronic device 102, magnetic motion device 104, magnetically movable object 106, display 108, magnetic field source 110, and magnetic field 114 in system 100.

In some implementations, imparting motion includes moving a portion magnetically movable object 706 with respect to at least another portion of magnetically movable object 706. For example, as shown in FIGS. 7A and 7B, magnetically movable object 706 has portions 750a and 750b, where portion 750b is moved with respect to portion 750a at location ($X_1$, $Y_1$), as indicated by motion 740d. Examples of portion 750b include a rotor, a propeller, a switch, and an articulation point. Controller 122 adjusts magnetic field 714 to move portion 750b with respect to portion 750a by, for example, altering an intensity of magnetic field 714 and/or using other means. For example, in one implementation, controller 122 adjusts magnetic field 714 by pulsing magnetic field 714 in intensity and/or reversing polarity of magnetic field 714.

As another example, in one implementation, portions 750a and 750b (or more portions) are each capable of moving where controller 122 adjusts magnetic field 714 to provide a first magnetic force to move portion 750a and a second magnetic force to move portion 750b. For example, portion 750b can require the second magnetic force to be greater than the first magnetic force in order to move. As a specific example, portion 750a can be a head portion of magnetically movable object 706 (e.g. an action figure) and portion 750b can be an arm portion of magnetically movable object 706.

By, moving portion 750b with respect to portion 750a, system 700 can achieve more complex motion for magnetically movable object 706. For example, controller 122 can use magnetic field source 710 to trigger switches within magnetically movable object 706 and/or to reconfigure magnetically movable object 706 physically and/or electronically. Furthermore, controller 122 can use magnetic field source 710 to provide power to magnetically movable object 706, which can be stored by magnetically movable object 706. As an example, the motion of portion 750b can be converted into power in magnetically movable object 706.

Thus, implementations of the present disclosure include controller 122 to impart motion to magnetically movable object 106 by using magnetic field source 110 to adjust magnetic field 114. As such, a user can interact with magnetically movable object 106, which can be a toy or other interactive object. Furthermore, because magnetic field source 110 can produce magnetic field 114 that is applied to magnetically movable object 106 through display 108, interactivity can be further enhanced. For example, electronic device 102 can modify what is presented on display 108 based on the motion imparted to magnetically movable object 106. Also, magnetically movable object 106 can be moved based on what is shown on display 108. Thus, implementations of the present disclosure can provide new interactive experiences to electronic devices, some of which are described below for illustrative purposes.

Using implementations of the present disclosure, controller 122 can impart motion to magnetically movable object 106 and/or other magnetically movable objects over display 108 by adjusting magnetic field 114 that is produced by magnetic field source 110. In some implementations, controller 122 imparts motion to the other magnetically movable objects using respective magnetic field sources, similar to magnetic field source 110, and respective magnetic fields. However, controller 122 can use magnetic field source 110 to impart motion to magnetically movable object 106 and to the other magnetically movable objects. For example, in some implementations, location data 130 stores a location of magnetically movable object 106 and other locations of other magnetically movable objects that are over display 108. Thus, controller 122 can impart motion to magnetically movable object 106 at one location (stored in location data 130), can demagnetize magnetic field source 110 and move magnetic field source 110 to another location (stored in location data 130), can magnetize magnetic field source 110 and impart motion to another magnetically movable object at the another location, and can later move back to the location of magnetically movable object 106.

Thus, for example, system 100 can present a story with magnetically movable object 106 and/or other magnetically movable objects, where each magnetically movable object can represent, for example, a character in the story. Display 108 and/or other multimedia components of system 100, including speakers, can be integrated into the story to provide a rich interactive experience. Furthermore, using touch input 112, system 100 can effectively track magnetically movable object 106 and/or other magnetically movable objects over display 108. For example, system 100 can determine location ($X_1$, $Y_1$) of magnetically movable object 106. Also, using touch input 112, system 100 can determine the orientation of magnetically movable object 106 with respect to display 108 and/or other magnetically movable objects. As one example, commonly owned U.S. Patent Application Publication No. 2012/0007808 titled "Interactive Game Pieces using Touch Screen Devices for Toy Play" describes determining the orientation of a peripheral device, which can correspond to magnetically movable object 106. In the present implementation, controller 122 can determine the orientation, for example. Thus, it can be determined whether magnetically movable object 106 is facing another magnetically movable object and/or digital elements on display 108, as examples.

Another example is a game of chess, where magnetically movable object 106 represents a chess piece. Different magnetically movable objects can represent different chess pieces. The game of chess can be presented on display 108 of electronic device 102. Electronic device 102 could control a computer opponent against a user and controller 122 could move the chess piece and the different chess pieces in response to a turn taken by the computer opponent.

As another example, electronic device 102 can be a television with display 108 being a flat screen display of the television and magnetically movable object 106 can be a used as a physical cursor or pointer on the flat screen display. Thus, for example, a user can control magnetically movable object 106 using a mouse for input. Controller 122 can use device interface 124 to communicate with the mouse and to move magnetically movable object 106 based on the input from the mouse.

In yet another example, magnetically movable object 106 can include a writing tool and a piece of paper could be placed between magnetic field source 110 and the writing tool of magnetically movable object 106. The user can then control movement of magnetically movable object 106 to draw on the paper, or controller 122 can move magnetically movable object 106 to draw on the paper without user control, as examples. Similarly, the drawing tool can be a whiteboard marker and display 108 can be a whiteboard. Thus, a professor can draw on the whiteboard from a remote location for a class presentation, or the class presentation can be saved as a digital presentation that can be replayed without requiring live input from the professor.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A magnetic motion device for moving a magnetically movable object disposed on a display on a front side of a tablet computer having a back side, the magnetic motion device comprising:
    a surface for placing the back side of the tablet computer thereon;
    a communication interface configured to receive a location of the magnetically movable object on the display;
    a magnetic field source disposed below the surface for producing a magnetic field; and
    a controller for receiving the location via the communication interface and applying the magnetic field, at the location, through the back side of the tablet computer placed on the surface, to the magnetically movable object disposed on the display of the tablet computer.

2. The magnetic motion device of claim 1, wherein the controller is configured to impart a repelling motion to the magnetically movable object.

3. The magnetic motion device of claim 1, wherein the controller is configured to repeatedly reverse the polarity of the magnetic field to cause a vibration of the magnetically movable object.

4. The magnetic motion device of claim 1, wherein a width and a length of the surface extends for an entire width and length of the display, respectively.

5. The magnetic motion device of claim 1, wherein the controller is further configured to alter an intensity of the magnetic field.

6. The magnetic motion device of claim 1, wherein the controller is further configured to receive a second location of the magnetically movable object on the display via the communication interface and apply the magnetic field, at the second location, through the back side of the tablet computer placed on the surface, to the magnetically movable object disposed on the display of the tablet computer.

7. The magnetic motion device of claim 1, wherein the magnetically movable object is a car, and wherein the controller is further configured to move the car on the display by applying the magnetic field to a plurality of locations including the location on the display.

8. The magnetic motion device of claim 1, wherein the magnetic field provides power to the magnetically movable object for storage therein.

9. The magnetic motion device of claim 1, wherein the tablet computer includes a communication interface and the display is a touch sensitive display, and wherein the communication interface of the magnetic motion device receives the location of the magnetically movable object from the communication interface of the tablet computer detected by the touch sensitive display.

10. The magnetic motion device of claim 1, wherein the tablet computer includes a communication interface, and wherein the communication interface of the magnetic motion device receives the location of the magnetically movable object from the communication interface of the tablet computer.

11. A magnetic motion system comprising:
   a magnetically movable object;
   a tablet computer including:
      a front side;
      a back side; and
      a display on the front side of the tablet computer;
   a magnetic motion device including:
      a surface for placing the back side of the tablet computer thereon;
      a communication interface configured to receive a location of the magnetically movable object on the display;
      a magnetic field source disposed below the surface for producing a magnetic field; and
      a controller for receiving the location via the communication interface and applying the magnetic field, at the location, through the back side of the tablet computer placed on the surface, to the magnetically movable object disposed on the display of the tablet computer.

12. The magnetic motion system of claim 11, wherein the controller is configured to impart a repelling motion to the magnetically movable object.

13. The magnetic motion system of claim 11, wherein the controller is configured to repeatedly reverse the polarity of the magnetic field to cause a vibration of the magnetically movable object.

14. The magnetic motion system of claim 11, wherein a width and a length of the surface extends for an entire width and length of the display, respectively.

15. The magnetic motion system of claim 11, wherein the controller is further configured to alter an intensity of the magnetic field.

16. The magnetic motion system of claim 11, wherein the controller is further configured to receive a second location of the magnetically movable object on the display via the communication interface and apply the magnetic field, at the second location, through the back side of the tablet computer placed on the surface, to the magnetically movable object disposed on the display of the tablet computer.

17. The magnetic motion system of claim 11, wherein the magnetically movable object is a car, and wherein the controller is further configured to move the car on the display by applying the magnetic field to a plurality of locations including the location on the display.

18. The magnetic motion system of claim 11, wherein the magnetic field provides power to the magnetically movable object, and the magnetically movable object stores the power therein.

19. The magnetic motion system of claim 11, wherein the tablet computer includes a communication interface and the display is a touch sensitive display, and wherein the communication interface of the magnetic motion device receives the location of the magnetically movable object from the communication interface of the tablet computer detected by the touch sensitive display.

20. The magnetic motion system of claim 11, wherein the tablet computer includes a communication interface, and wherein the communication interface of the magnetic motion device receives the location of the magnetically movable object from the communication interface of the tablet computer.

* * * * *